Patented Aug. 13, 1935

2,011,321

UNITED STATES PATENT OFFICE 2,011,321

CONDIMENT

Arthur A. Levinson, Chicago, Ill., assignor of one-half to Hugh E. Allen, Chicago, Ill., and one-half to Albert G. McCaleb, Evanston, Ill.

No Drawing. Application October 23, 1933, Serial No. 694,883

3 Claims. (Cl. 99—11)

This invention relates to condiments, particularly intended for the condimentation of ground meats, for example, in the manufacture of spiced or flavored meat preparations such as sausages, frankfurters, balogna, meat loaves, and the like.

In United States Patent No. 1,781,154 issued November 11, 1930 on the application of Hugh E. Allen, and Patent No. 1,829,431 issued October 27, 1931 on the application of Hugh E. Allen, there are described seasoning or condimentation materials comprising essential oils of spices and/or oleoresins of peppers distributed upon a carrier of sugar, the whole forming a dry pulverulent composition wholly soluble in the juices of meats.

Efforts heretofore made to substitute salt for sugar in these compositions have not been successful. For some reason or other salt when used as a carrier causes the destruction of the essential oils and/or oleoresins. Apparently the absorption of moisture by the salt is intimately connected with the formation of a rancid and spoiled product. While I do not know exactly the cause of the destruction of the essential oils and/or oleresins in the presence of salt, I believe that the production of acid products is involved and that these acid products cause rapid deterioration of the essential oils and/or olcoresins.

I have now discovered that these objections and difficulties can be completely obviated in a new and novel manner, which stated briefly, consists in the incorporation of a relatively small amount of tricalcium phosphate in the salt product. This incorporation enables salt to be employed as a carrier with results as satisfactory as heretofore provided by the sugar product. In addition to its effect of preventing or indefinitely delaying the destruction or deterioration of the essential oils and/or oleoresins, the tricalcium phosphate acts as a caking inhibiter. Any slight caking which may occur gives a cake of very crumbly nature which can be readily broken by hand.

The amount of tricalcium phosphate employed is not critical. I have obtained excellent results with approximately 1% of tricalcium phosphate with relation to the main carrier, salt. The effect of the tricalcium phosphate is, however, present in marked degree with substantially lower and substantially higher percentages. In order to obtain full efficacy of the tricalcium phosphate, the same should be present in finely divided and thoroughly distributed condition throughout the mass. This result can readily be obtained by grinding the ingredients together in a suitable mill.

I prefer to grind the materials approximately to a fineness of 400 mesh. It will readily be understood that this degree of fineness is not critical. The essential oils and/or oleoresins, in desired amounts for the attainment of desired flavoring qualities, may be distributed throughout the mass in the same grinding operation.

The finely divided and widely distributed tricalcium phosphate appears to hold the essential oils and resins in a very fine suspension in the salt mixture. Seepage, or loss of the oils and oleoresins from the mixture appears to be at a minimum. The tricalcium phosphate appears to have the effect of preventing the reaction of moisture with salt. It is not believed that the tricalcium phosphate absorbs the moisture from the salt or from the air. It appears to have a tendency to repel moisture, and thereby prevent any contact of the moisture with the essential oils and/or oleoresins.

Another property of the tricalcium phosphate is that it is only slightly alkaline in reaction and may be considered practically neutral. However, any slight amount of acid which is formed is quickly neutralized and further deterioration in this direction is prevented.

In order that the invention may more readily be understood by those skilled in the art I give the following example:

Example.—I take 94 pounds of common salt and add thereto 1 pound of tricalcium phosphate and 3 pounds of essential oils and/or distilled essences of spices and oleoresins of peppers. The oils, essences and oleoresins employed and the proportions in which they are employed depends upon the nature of the flavoring or seasoning which it is desired to impart to the meats. I grind these ingredients together in a suitable mill until they are reduced to a fineness of approximately 400 mesh. The final product is dry to the touch and can be packed in containers which will handle dry but not liquid materials.

Although the invention has been described in connection with the specific details of a preferred embodiment thereof, it is not intended that such details should be considered limitative of the invention except so far as set forth in the accompanying claims.

Having thus described my invention, I declare that what I claim is:

1. A dry seasoning material for ground meats comprising essential oils of spices, oleoresins of peppers, tricalcium phosphate and a relatively large quantity of finely divided salt, upon the particles of which said substances are distributed.

2. A substantially dry material for seasoning ground meats consisting of a major quantity of finely divided salt, a minor quantity of spice oils and oleoresins of peppers, and a minor quantity of finely divided tricalcium phosphate, the oils and oleoresins and the tricalcium phosphate being widely distributed throughout the mass.

3. A substantially dry material for seasoning ground meats consisting of a major quantity of finely divided salt, a minor quantity of oleoresins of peppers, and a quantity of finely divided tricalcium phosphate sufficient to neutralize any slight amount of acid which may form in the material, the oleoresins and the tricalcium phosphate being widely distributed throughout the mass.

ARTHUR A. LEVINSON.